(12) United States Patent
Chiang et al.

(10) Patent No.: US 8,003,250 B2
(45) Date of Patent: Aug. 23, 2011

(54) HIGH ENERGY AND POWER DENSITY ELECTROCHEMICAL CELLS

(75) Inventors: Yet Ming Chiang, Framingham, MA (US); Antoni S. Gozdz, Marlborough, MA (US); Gilbert N. Riley, Jr., Marlborough, MA (US)

(73) Assignee: A123 Systems, Inc., Waltham, MA (US)

( * ) Notice: Subject to any disclaimer, the term of this patent is extended or adjusted under 35 U.S.C. 154(b) by 121 days.

(21) Appl. No.: 11/159,989

(22) Filed: Jun. 23, 2005

(65) Prior Publication Data

US 2006/0292444 A1    Dec. 28, 2006

Related U.S. Application Data

(63) Continuation of application No. PCT/US03/41353, filed on Dec. 23, 2003.

(60) Provisional application No. 60/436,340, filed on Dec. 23, 2002.

(51) Int. Cl.
*H01M 4/02* (2006.01)
*H01M 4/88* (2006.01)

(52) U.S. Cl. ............... 429/209; 429/218.1; 252/182.1

(58) Field of Classification Search ............ 429/306, 429/126, 218.1, 145
See application file for complete search history.

(56) References Cited

U.S. PATENT DOCUMENTS

| 5,804,335 | A | * | 9/1998 | Kamauchi et al. | 429/231.95 |
| 5,910,382 | A | * | 6/1999 | Goodenough et al. | 429/218.1 |
| 5,965,293 | A |   | 10/1999 | Idota et al. | |
| 6,528,033 | B1 |  | 3/2003 | Barker et al. | |
| 6,797,428 | B1 | * | 9/2004 | Skotheim et al. | 429/126 |
| 2001/0005718 | A1 | | 6/2001 | Wen-Tung et al. | |
| 2002/0028383 | A1 | | 3/2002 | Kugai et al. | |
| 2002/0106564 | A1 | | 8/2002 | Okawa et al. | |
| 2002/0192137 | A1 | * | 12/2002 | Chaloner-Gill et al. | 423/306 |
| 2003/0077514 | A1 | * | 4/2003 | Barker et al. | 429/221 |
| 2003/0118896 | A1 | * | 6/2003 | Yamaguchi et al. | 429/145 |
| 2003/0215717 | A1 | | 11/2003 | Miyaki | |
| 2004/0018430 | A1 | * | 1/2004 | Holman et al. | 429/233 |

FOREIGN PATENT DOCUMENTS

| JP | 11-135115 A | 5/1999 |
| JP | 2001-307732 A | 11/2001 |
| JP | 2002-97564 A | 4/2002 |
| JP | 2002-117833 A | 4/2002 |
| WO | WO 2004/059758 | * 7/2004 |

* cited by examiner

*Primary Examiner* — Cynthia Lee
(74) *Attorney, Agent, or Firm* — Wilmer Cutler Pickering Hale and Dorr LLP

(57) ABSTRACT

The energy density of the entire cell may be improved while retaining high power density by use of an alkali metal transition metal polyanion compound as the cathode and a thin film metal or metalloid anode. The thin film anode may be initially unalloyed or partially unalloyed. During use, the thin film anode may be only partially unalloyed relative to the theoretical maximum. The high volumetric capacity of the metal anode makes it possible to use a dense or porous thin film anode in conjunction with a relatively thin particle-based cathode to thereby improve the energy density of the cell.

59 Claims, 7 Drawing Sheets

HIGH ENERGY AND POWER DENSITY ELECTROCHEMICAL CELLS

CROSS REFERENCE TO RELATED APPLICATIONS

This application is a continuation of PCT Application No. US03/041353, filed Dec. 23, 2003, and designating the United States, which claims the benefit of priority under 35 USC Sec. 119(e) to United States Provisional Application No. 60/436,340, filed Dec. 23, 2002, the contents of which are incorporated in their entirety.

BACKGROUND OF THE INVENTION

1. Field of the Invention

The present invention relates to the field of electrochemical cells, and in particular electrochemical cells having both high energy and power density.

2. Description of the Related Art

The lithium rechargeable battery is an attractive technology due to its comparatively high energy density, low potential for environmental and safety hazard, and relatively low associated materials and processing costs. The lithium battery is charged by applying a voltage between the battery's electrodes, which causes lithium ions and electrons to be withdrawn from lithium hosts at the battery's cathode. Lithium ions flow from the cathode to the battery's anode through an electrolyte to be reduced at the anode, the overall process requiring energy. Upon discharge, the reverse occurs; lithium ions and electrons are allowed to re-enter lithium hosts at the cathode while lithium is oxidized to lithium ions at the anode, an energetically favorable process that drives electrons through an external circuit, thereby supplying electrical power to a device to which the battery is connected.

Currently known cathode storage compounds such as $LiCoO_2$ and $LiMn_2O_4$ when used with currently known anodes such as lithium metal or carbon have working voltages between 3 and 4V. For many applications a high voltage and low weight are desirable for the cathode as this leads to high specific energy. For example, for electrical vehicle applications the energy-to-weight ratio of the battery determines the ultimate driving distance between recharging. The power density of the battery is equally important for many applications. For example, in a hybrid electric vehicle the power density has great influence on the rate of acceleration, or the rate at which regenerated braking energy can be recaptured by the battery system. Thus for many applications both a high energy density and a high power density are necessary. In addition, it is desirable to have lithium storage materials that are low in cost and nontoxic to the environment. It is also desirable to have storage materials that when combined with other components of a battery system such as liquid electrolyte remain safe. It is also desirable to have storage materials that are stable and have a long operating life over a wide range of temperatures.

Cathodes in state-of-the-art rechargeable lithium batteries contain lithium ion host materials, electronically conductive particles to electronically connect the lithium ion hosts to a current collector (i.e., a battery terminal), a binder, and a lithium-conducting liquid electrolyte. The lithium ion host particles typically are particles of lithium intercalation compounds, and the electronically conductive particles are typically made of a substance such as a high surface area carbon black or graphite. Commonly used cathode storage materials such as $LiCoO_2$, $LiNiO_2$, and $LiMn_2O_4$ and their derivatives suffer from the disadvantages of high cost, toxicity, instability at elevated temperatures, or instability in the charged state.

Anodes for rechargeable lithium-ion batteries typically contain a lithium ion host material such as graphite, electronically conductive particles to electronically connect the lithium ion hosts to a current collector (i.e., a battery terminal), a binder, and lithium conducting liquid electrolyte. Carbon-based anodes have the disadvantage of a relatively low volumetric energy density due to their low density of about 2 $g/cm^3$.

Lithium transition metal polyanion compounds are of interest for electrochemical applications, including as storage cathodes for rechargeable lithium batteries, due to their potentially high energy density, low raw materials cost, environmental friendliness, and safety. Such polyanion compounds include $Li_xMXO_4$ of the olivine structure, $Li_xM_2(XO_4)_3$ of the NASICON structure type, $VOPO_4$, $LiFe(P_2O_7)$ and $Fe_4(P_2O_7)_3$, and derivative structures that have additional interstitial metal ions, symmetry-changing displacements, or minor changes in the connectivity of polyhedra. Polyanion compounds typically contain compact tetrahedral "anion" structural units $(XO_4)^{n-}$, (X=P, S, As, Mo, W, Si, Al, and B) with significant covalent bonding character, which are joined in a manner producing other sites such as oxygen octahedra or tetrahedral that are occupied by other metal ions.

It was previously accepted that this class of compounds has a fundamental limitation of low electronic conductivity, desirable for solid electrolytes but limiting in applications as ion-storage or fuel cell electrodes. Indeed, the published literature contains many references by those skilled in the art to the insulating nature of these compounds, and the corresponding limitations on their utility as battery storage materials. These references include "Approaching Theoretical Capacity of $LiFePO_4$ at Room Temperature at High Rates," H. Huang, S.-C. Yin and L. F. Nazar, *Electrochem. Sol. St. Lett.*, 4[10] A170-A172 (2001); J. Gaubicher, T. Le Mercier, Y. Chabre, J. Angenault, and M. Quarton, "Li/β-$VOPO_4$: A New 4 V System for Lithium Batteries," *J. Electrochem. Soc.*, 146[12] 4375-4379 (1999); and "Issues And Challenges Facing Rechargeable Lithium Batteries," J.-M. Tarascon and M. Armand, *Nature*, 414, 359-367 (2001).

The gravimetric energy densities of several of this class of compounds are attractive when compared with previously used cathode-active materials. However, due to crystal densities that are typically lower than those of cathodes such as ordered rocksalt structure compounds like $LiCoO_2$, $LiNiO_2$, and orthorhombic $LiMnO_2$, or spinel structure compounds like $LiMn_2O_4$, or their derivatives, alkali metal transition metal polyanion compounds typically have lower volumetric energy densities. Electrochemical cells including storage batteries that utilize these polyanion compounds therefore also tend to have lower volumetric energy densities.

Thus, it has heretofore not been possible to obtain an electrochemical cell using lithium-ion intercalating compounds having high power density, safety, and long life while also having high energy density comparable or superior to conventional lithium ion cells.

SUMMARY OF THE INVENTION

Compositions of alkali metal transition metal polyanion compounds can be obtained by selection of suitable starting materials and processes. In particular, highly electronically conductive and high specific surface area forms of these lithium storage compounds, and their electrodes, exhibit remarkably high power densities. Substantially increased electronic conductivity enabling good electrochemical performance in an electrochemical cell can also be obtained in an electrode utilizing alkali metal transition metal polyanion compounds by adding a conductive additive phase such as carbon or a metal, during the synthesis process of the compound or afterwards, including the addition of conductive additives to a powder of said compound or an electrode formulation containing said compound. Combined with other attributes such as substantially high gravimetric energy density, extreme safety and stability, and low cost, these polyanion compounds have many attractive features in electrochemical cells including storage batteries.

In one aspect of the present invention, an electrochemical device includes a cathode comprising an alkali metal transition metal polyanion compound, a thin film metal anode comprising a metal or metalloid that can be alloyed with alkali metal; and an electrolyte in ionic contact with both the anode and the cathode.

In one or more embodiments, the thin film anode has a thickness of less than about 10 micrometers, or less than about 6 micrometers, or less than 4 micrometers, or less than 2 micrometers.

In another embodiment of the invention, an electrochemical device includes a cathode comprising an alkali metal transition metal polyanion compound; a thin film lithium anode having a thickness of less than six micrometers; and an electrolyte in ionic contact with both the anode and the cathode.

In one or more embodiments, the metal is selected from the group consisting of lithium, aluminum, silver, boron, bismuth, cadmium, gallium, germanium, indium, lead, tin, silicon, antimony, and zinc, and compounds and alloys thereof.

In one or more embodiments, the anode occupies a volume in the cell in the range of about 3% to 10%.

In one or more embodiments, the anode occupies a weight in the cell in the range of about 3% to 10%.

In one aspect of the present invention, an electrochemical cell includes a thin layer cathode electrode, a thin film metal or metalloid anode having a thickness of less than about 6 micrometers, and an electrolyte.

In one or more embodiments, the alkali metal intercalation compound comprises an alkali metal transition metal polyanion compound having an electronic conductivity greater than about $10^{-8}$ S/cm, or about $10^{-6}$ S/cm or higher.

BRIEF DESCRIPTION OF THE DRAWING

The invention is described with reference to the following drawings, which are presented for the purpose of illustration only and are not intended to be limiting of the invention, and where.

DETAILED DESCRIPTION OF THE INVENTION

Figure 1:
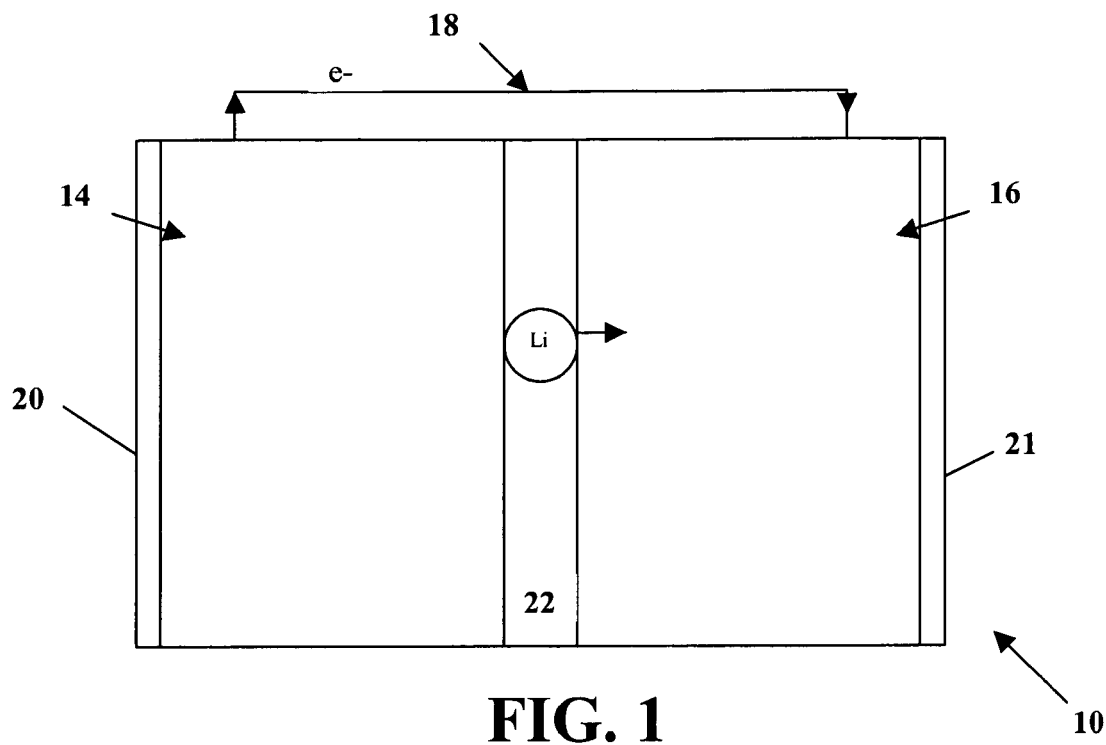
FIG. 1 is a schematic illustration of a conventional intercalation anode/cathode system, shown here in charging mode.

Certain alkali metal transition metal polyanion compounds exhibit increased electronic conductivity and increased specific surface area, which render the compounds useful as lithium storage materials. In one or more embodiments, increased electronic conductivity is observed in alkali metal transition metal polyanions for which the alkali metal site or the transition metal site, or both, have been substituted in part with a metal from any of Group IIA, IIIA, IVA, VA, VIA, VIIA, VIIIA, IB, IIB, IIIB, IVB, VB, and VIB, or by a vacancy. In one or more embodiments, increased specific area is observed by decreasing the primary crystallite size of the compound. Exemplary polyanion compounds include modified lithium transition metal phosphate compounds, which are modified to increase electronic conductivity. Lithium transition metal phosphate belongs to the general group of polyanions with a tetrahedral "anion" structural unit $(XO_4)^{n-}$, wherein X can be P, S, As, Mo, or W, along with oxygen octrahedra occupied by a transition metal M. The full details of the material and its preparation are set forth in the co-pending application U.S. Ser. No. 10/329,046, filed Dec. 23, 2002 and entitled "Conductive Lithium Storage Electrode," which is incorporated in its entirety by reference as part of this application.

Increases in conductivity and specific surface area of the cathode electroactive material provide an increase in its charge capacity, at a given charge/discharge current rate, without significantly changing the potential of the material relative to lithium metal. Increasing the conductivity and decreasing the primary crystallite size allows the cathode material to be charged and discharged at much higher rates without significant loss of capacity. That is, the energy density of these cathode materials, and of a battery using these cathode materials, can be greater relative to undoped $LiFePO_4$, by improving the electronic conductivity and decreasing the crystallite size.

As used herein, charge and discharge capacity will be given in units of ampere hours per kilogram of the storage material (Ah/kg) or milliampere hour per gram of storage material (mAh/g), charge and discharge rate in units of both milliamperes per gram of the storage compound (mA/g), and C rate. When given in units of C rate, the C rate is defined as the inverse of the time, in hours, necessary to utilize the full capacity of the battery measured at a slow rate. A rate of 1 C refers to a time of one hour; a rate of 2 C refers to a time of half an hour, a rate of C/2 refers to a time of two hours, and so forth. Typically, the C rate is computed from the rate, in mA/g, relative to the capacity of the compound or battery measured at a lower rate of C/5 or less. For example, in some examples herein the nominal capacity of a doped $LiFePO_4$ compound at low rate is about 150 mAh/g, and therefore a rate of 1 C corresponds to a current rate of 150 mA/g, a rate of C/5 corresponds to 30 mA/g, a rate of 5 C corresponds to 750 mA/g, and so forth. Volumetric capacity will be given in units of $mAh/cm^3$, gravimetric energy density in Wh/kg, volumetric energy density in Wh/liter, gravimetric power density in W/kg, and volumetric power density in W/liter.

Although the alkali metal transition metal polyanion compounds, such as doped $LiFePO_4$, exhibit high cycling (charge/discharge) rates without compromise to the energy density of the cathode material, the volumetric energy density is still low relative to other conventional lithium-intercalating materials such as $LiCoO_2$. The volumetric energy density of doped-$LiFePO_4$ is relatively low due to its lower crystal density. The olivine solid state structure of these compounds is less dense than the structure of $LiCoO_3$, without providing any additional lithium storage capacity on a molar basis, and thus inherently are of lower volumetric energy density.

The present invention has surprisingly and unexpectedly discovered that the energy density of the entire cell may be improved while retaining high power density by use of an alkali metal transition metal polyanion compound as the cathode and a thin film metal or metalloid anode. Indeed, irrespective of the rate capability of the polyanion compound, the energy density of the entire cell may be improved. The thin film is capable of intercalating or alloying with the alkali metal. The thin film anode may be initially unalloyed or partially alloyed with the alkali metal. During use, the thin film anode may be only partially alloyed relative to the theoretical maximum concentration possible at saturation. "Saturation" is understood to mean the condition whereby the thermodynamic activity of lithium is at least as high as that of bulk metallic lithium. In one or more embodiments, when fully charged the cathode supplies an amount of alkali metal to the anode that is 90% of the maximum capacity of the anode. In one or more embodiments, when fully charged the cathode supplies an amount of alkali metal to the anode that is 70% of the maximum capacity of the anode. In one or more embodiments, when fully charged the cathode supplies an amount of alkali metal to the anode that is 50% of the maximum capacity of the anode. In one or more embodiments, when fully charged the cathode supplies an amount of alkali metal to the anode that is 40% of the maximum capacity of the anode. In one or more embodiments, when fully charged the cathode supplies an amount of alkali metal to the anode that is 30% of the maximum capacity of the anode. The high volumetric capacity of the metal anode makes it possible to use a dense or porous thin film anode in conjunction with a relatively thin particle-based cathode to thereby improve the energy density of the cell. Metal anodes are selected having a high gravimetric charge capacity, and/or a high volumetric charge capacity, so that only a small mass or volume of the high capacity metal anode is required to compensate for the lower energy density cathode material. The metal anode having a charge capacity greater than that of a graphite anode provides improvements to the total cell energy density. By replacing a conventional carbon anode with a significantly thinner layer of metal anode, the anode volume and weight decreases significantly, without loss of battery performance. This increases proportionately the energy and power density of the cell.

In one or more embodiments of the present invention, the metal anode may be a pure alkali metal such as lithium. The lithium thin film has a thickness of 10 micrometers or less.

Metal or metalloid anodes have previously been found to have poor reversible storage capacity in bulk or thick film form. In one or more embodiments of the present invention, the use of a relatively low capacity cathode allows the anode to be thin enough to exhibit excellent reversibility while still improving the overall cell performance.

In one or more embodiments, the invention provides an electrochemical cell having both high energy density and higher power density. The device includes a high power density cathode material and a high gravimetric charge capacity, and/or a high volumetric charge capacity thin film metal anode including a metal or metalloid. In one or more embodiments, the high power density cathode includes a compound from the $LiFePO_4$ family, and the anode is a thin film metal or metalloid that can be alloyed with lithium at voltage less than that of $LiFePO_4$. The reduced volume and weight of the anode compensates for the lower energy density (relative to $LiCoO_2$) of the $LiFePO_4$ cathode so that the energy density of the cell is maintained or even increased relative to that of a conventional $LiCoO_2$-based cell. In one or more embodiments, the invention provides improved volumetric and gravimetric energy density to an electrochemical cell utilizing an alkali metal transition metal polyanion compound as the cathode-active material.

Table 1 lists several metals and metalloids, their gravimetric and volumetric energy capacity when lithiated to a particular concentration or stoichiometry and the corresponding volume expansion of the material. These data show that the volume expansion increases monotonically with lithium concentration. Compared to carbon, higher gravimetric and volumetric charge capacities are available for at least one known lithium alloy of aluminum, silver, boron, bismuth, cadmium, gallium, germanium, indium, lead, tin, silicon, antimony and zinc. It is also apparent from these data that the volumetric and gravimetric charge capacities for these metals are so much greater than that of a conventional graphite anode (372 mAh/g or 836.9 $mAh/cm^3$) that the metal need only be partially lithiated (relative to the theoretical maximum concentration) in order to realize an anode capacity exceeding that of graphite. Lithiation to higher concentrations provides higher storage capacity but can increase first-cycle capacity loss and decrease cycling stability due to the greater volume change. Thus, in one or more embodiments of the invention, a partially lithiated anode is provided in an electrochemical cell to decrease the volume expansion of the anode and thereby improve cycling stability of the anode, while also improving the capacity and energy density of the entire cell relative to an electrochemical cell using same cathode and a conventional graphite anode.

TABLE 1

| Metal | MW (g/mole) | Density (g/cm3) | Molar Volume (cm3/mole of metal) | Lithiated Compound | MW (g/mole) | Density (g/cm3) | Molar Volume (cm3/mole of metal) | Average Voltage (against Li) | Theor. Weight Capacity (Ah/kg of starting metal) | Theor. Volume Capacity (mAh/cm3 of starting metal) | Lithiated Compound to Metal Molar Volume Ratio |
|---|---|---|---|---|---|---|---|---|---|---|---|
| Li | | | | Li | 6.941 | 0.53 | 13.1 | 0 | 3860 | 2047 | |
| Al | 26.98 | 2.7 | 9.99 | LiAl | 33.92 | 1.741 | 19.48 | 0.36 | 993.5 | 2683 | 1.95 |
| | | | | Li9Al4 | 170.4 | 1.269 | 33.57 | | 2235.5 | 6035.7 | 3.36 |
| | | | | Li3Al | 74.79 | 1.484 | 50.4 | | 2980.6 | 8047.6 | 5.05 |
| Ag | 107.87 | 10.5 | 10.27 | LiAg | 114.81 | 5.962 | 19.26 | | 248.5 | 2609.2 | 1.88 |
| | | | | Li10Ag3 | 393.01 | 2.658 | 49.29 | | 828.3 | 8697.5 | 4.8 |
| B | 10.81 | 2.34 | 4.62 | Li5B4 | 77.95 | 1.075 | 18.13 | 0.02 | 3099.6 | 7253.1 | 3.92 |
| | | | | Li7B6 | 113.45 | | | 0.02 | 2893 | ?? | ?? |
| Bi | 208.98 | 9.8 | 21.32 | Li3Bi | 229.8 | 5.025 | 45.73 | 0.81 | 384.8 | 3771 | 2.15 |
| | | | | LiBi | 215.92 | 7.43 | 29.06 | 0.83 | 128.3 | 1257 | 1.36 |
| Cd | 112.41 | 8.65 | 13 | LiCd | 119.35 | 5.269 | 22.65 | 0.25 | 238.5 | 2062.7 | 1.74 |
| | | | | Li3Cd | | | | 0.02 | 715.5 | ?? | 2.68 |
| Cu | 63.55 | 8.96 | 7.09 | Li0.25Cu | 65.29 | 8.96 | 7.29 | | 105.5 | 944.8 | 1.03 |
| Cu | 63.55 | 8.96 | 7.09 | Li0.25Cu | 65.29 | 8.96 | 7.29 | | 105.5 | 944.8 | 1.03 |
| Ga | 69.72 | 5.91 | 11.8 | Li5Ga4 | 313.59 | 3.804 | 20.61 | | 480.6 | 2840.3 | 1.75 |
| | | | | Li2Ga | 83.6 | 2.923 | 28.6 | | 769 | 4544.5 | 2.42 |
| | | | | Li3Ga2 | 160.26 | 3.479 | 23.03 | | 576.7 | 3408.4 | 1.95 |
| | | | | LiGa | 76.66 | 4.259 | 18 | | 384.5 | 2272.2 | 1.53 |
| Ge | 72.59 | 5.35 | 13.57 | Li11Ge6 | 511.89 | 2.973 | 28.7 | | 677 | 3622 | 2.12 |
| | | | | Li11Ge6 | 511.89 | 2.973 | 28.7 | | 677 | 3622 | 2.12 |
| | | | | Li7Ge2 | 193.77 | 2.277 | 42.55 | | 1345.7 | 7199.3 | 3.14 |
| | | | | Li7Ge2 | 193.77 | 2.277 | 42.55 | | 1345.7 | 7199.3 | 3.14 |
| | | | | Li22Ge5 | 515.65 | 2.042 | 50.5 | | 1691.7 | 9050.5 | 3.72 |
| | | | | Li22Ge5 | 515.65 | 2.042 | 50.5 | | 1691.7 | 9050.5 | 3.72 |
| In | 114.82 | 7.3 | 15.73 | Li3In2 | 250.46 | 4.336 | 28.88 | | 350.2 | 2556.4 | 1.84 |
| | | | | Li3In3 | 434.69 | 2.318 | 62.51 | | 233.5 | 1704.2 | 3.97 |
| | | | | Li2In | 128.7 | 3.784 | 34.01 | | 466.9 | 3408.5 | 2.16 |
| | | | | LiIn | 121.76 | 5.146 | 23.66 | | 233.5 | 1704.2 | 1.5 |
| Pb | 207.2 | 11.34 | 18.27 | Li22Pb5 | 1188.7 | 3.948 | 60.22 | 0.292 | 569.2 | 6455.1 | 3.3 |
| | | | | LiPb | 214.14 | 8.004 | 26.75 | 0.45 | 129.4 | 1467.1 | 1.46 |
| | | | | Li8Pb3 | 677.13 | 5.369 | 42.04 | 0.45 | 345 | 3912.2 | 2.3 |
| | | | | Li7Pb2 | 462.99 | 4.579 | 50.56 | 0.292 | 452.8 | 5134.7 | 2.77 |
| | | | | Li3Pb | 228.02 | 5.065 | 45.02 | 0.374 | 388.1 | 4401.2 | 2.46 |
| | | | | Li10Pb3 | 691.01 | 4.479 | 51.43 | 0.292 | 431.2 | 4890.2 | 2.82 |
| Sb | 121.75 | 6.684 | 18.22 | Li2Sb | 135.63 | 3.786 | 35.82 | 0.95 | 440.3 | 2943.2 | 1.97 |
| | | | | Li2Sb | 135.63 | 3.786 | 35.82 | 0.95 | 440.3 | 2943.2 | 1.97 |
| | | | | Li3Sb | 142.57 | 3.336 | 42.74 | 0.95 | 660.5 | 4414.8 | 2.35 |
| | | | | Li3Sb | 142.57 | 3.336 | 42.74 | 0.95 | 660.5 | 4414.8 | 2.35 |
| | | | | Li3Sb | 142.57 | 2.963 | 48.17 | 0.95 | 660.5 | 4414.8 | 2.64 |
| | | | | Li3Sb | 142.57 | 2.963 | 48.17 | 0.95 | 660.5 | 4414.8 | 2.64 |
| Si | 28.09 | 2.33 | 12.06 | Li12Si7 | 279.89 | 1.526 | 26.2 | | 1635.9 | 3811.6 | 2.17 |
| | | | | Li21Si8 | 370.45 | | | 0.158 | 2505 | 5836.6 | ?? |
| | | | | Li13Si4 | 202.58 | 1.25 | 40.52 | 0.158 | 3101.4 | 7226.2 | 3.36 |
| | | | | Li21Si5 | 286.19 | 1.197 | 47.82 | 0.2 | 4008 | 9338.5 | 3.97 |
| Se | 78.96 | 4.79 | 16.48 | Li2Se | 92.84 | 2.852 | 32.55 | | 679 | 3252.2 | 1.96 |
| Sn | 118.69 | 7.31 | 16.24 | Li5Sn2 | 272.09 | 3.513 | 38.73 | 0.485 | 564.6 | 4127.3 | 2.39 |
| | | | | Li13Sn5 | 683.68 | 3.466 | 39.45 | 0.485 | 587.2 | 4292.4 | 2.43 |
| | | | | Li7Sn2 | 285.97 | 2.957 | 48.35 | 0.385 | 790.5 | 5778.2 | 2.98 |
| | | | | Li22Sn5 | 746.15 | 2.562 | 58.25 | 0.385 | 993.7 | 7264.1 | 3.59 |
| Zn | 65.39 | 7.13 | 9.17 | LiZn | 72.32 | 3.964 | 18.24 | 0.005 | 409.9 | 2992.8 | 1.99 |
| C (graphite) | 12.011 | 2.25 | 5.34 | LiC6 | 13.17 | | | 0.5 | 372 | 836.9 | |

In one or more embodiments, the anode is an alloy or compound of the metals in Table 1. In one or more embodiments, the anode contains Li, Al, Si, Sn, Sb, B, Ag, Bi, Cd, Ga, Ge, In, Pb, or Zn.

In one or more embodiments, the metal or metalloid anode is deposited on a metal foil current collector by processes known to those of ordinary skill in the art, such as but not limited to dc or rf magnetron sputtering, evaporation, chemical vapor deposition, plasma-enhanced chemical vapor deposition (PE-CVD), electroplating, electroless plating, and by coating with slurry or suspension of particles. In one or more embodiments the anode is applied as an oxide and then reduced to the metal, for example, by heat treating the oxide in reducing gas or exposing the oxide to a liquid reducing agent, or reacting the oxide with a metal or other compound of more negative Gibbs free energy of oxidation. In one or more embodiments the anode film is partially or completely lithiated after deposition by heating in proximity to metallic lithium, or by chemical lithiation with such agents as LiI or butyllithium. In one or more embodiments of the present invention, a lithiated anode film is partially delithiated prior to use as a negative electrode. In one or more embodiments the metal or metalloid anode film is coated with a passivation layer to provide mechanical or chemical protection or to improve cycle stability. Suitable passivating compounds are known to those of skill in the art and include layers of another material such as carbon, lithium phosphate ($LiPO_3$ or $Li_3PO_4$), lithium silicate, lithium carbonate, metal carbonates, metal oxides including aluminates and silicates, or metal hydroxides. In one or more embodiments such additives or others such as sulfur compounds, fluoro- and chloroesters, carboxylic acid anhydrides, vinylene carbonate, tributylamine, or organic bases are added to a liquid electrolyte cell containing the metal anode film to provide stability during cycling or storage.

In one or more embodiments, the cathode includes a lithium-intercalation compound, such as $LiCoO_2$, $LiNiO_2$, $LiMnO_2$, $LiMn_2O_4$, vanadium oxide, manganese oxide, or their derivatives. In other embodiments, the cathode includes a polyanion compound such as a compound of olivine ($A_xMXO_4$), NASICON ($A_x(M',M'')_2(XO_4)_3$), $VOPO_4$, $LiFe(P_2O_7)$ or $Fe_4(P_2O_7)_3$ structure-types. In still other embodiments, the cathode includes a conductive, high specific surface area compound such as a doped olivine compound $LiMPO_4$ that provides high charge capacity at high current density. In one or more embodiments, the includes an olivine compound of the formula $LiMPO_4$, where M is one or more of Fe, Mn, V, Ni or Co, and the compound is optionally doped on the site known as M1 that is normally occupied by lithium, or the compound is optionally doped on the site known as M2 that is normally occupied by the metal M by any of a Group IIA, IIIA, IVA, VA, VIA, VIIA, VIIIA, IB, IIB, IIIB, IVB, IVB, VB, OR VIIB metal. In one or more embodiments, the cathode is a doped $LiFePO_4$. The $LiFePO_4$ may be doped to have high electronic conductivity and high specific surface area as a powder, such as by doping with Al, Mg, Ti, Zr, Nb, Ta, or W as described in co-pending application U.S. Ser. No. 10/329,046, filed on Dec. 23, 2002.

In one or more embodiments, the cathode contains a compound comprising a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, having a conductivity at 27° C. of at least about $10^{-8}$ S/cm, wherein A is at least one of an alkali metal or hydrogen, M' is a first-row transition metal, X is at least one of phosphorus, sulfur, arsenic, boron, aluminum, silicon, vanadium, molybdenum and tungsten, M'' is any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001 < a \leq 0.1$, and x is equal to or greater than 0, y and z are greater than 0 and have values such that x, plus y(1−a) times a formal valence or valences of M', plus ya times a formal valence or valence of M'', is equal to z times a formal valence of the $XD_4$, $X_2D_7$, or $DXD_4$ group.

In one or more embodiments, the cathode contains a compound comprising a composition $(A_{b-a}M''_a)_xM'_y(XD_4)_z$, $(A_{b-a}M''_a)_xM'_y(DXD_4)_z$, or $(A_{b-a}M''_a)_xM'_y(X_2D_7)_z$, having a conductivity at 27° C. of at least about $10^{-8}$ S/cm, wherein A is at least one of an alkali metal or hydrogen, M' is a first-row transition metal, X is at least one of phosphorus, sulfur, arsenic, boron, aluminum, silicon, vanadium, molybdenum and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001 < a \leq 0.1$, $a \leq b \leq 1$, and x, y, and z are greater than zero and have values such that (b−a)x plus the quantity ax times the formal valence or valences of M'' plus y times the formal valence or valences of M' is equal to z times the formal valence of the $XD_4$, $X_2D_7$ or $DXD_4$ group.

In one or more embodiments, the cathode compound includes any of $Li_x(M'_{1-a}M''_a)PO_4$, $Li_xM''_aM'PO_4$, $Li_x(M'_{1-a-y}M''_aLi_y)PO_4$, or $Li_{x-a}M''_aM'_{1-y}Li_yPO_4$. The compound includes any of $Li_x(Fe_{1-a}M''_a)PO_4$, $Li_xM''_aFePO_4$, $Li_x(Fe_{1-a-y}M''_aLi_y)PO_4$, $Li_x(Fe_{1-y}Li_y)PO_4$, or $Li_{x-a}M''_aFe_{1-y}Li_yPO_4$.

In one or more embodiments, the cathode compound includes any of $Li_xvac_{1-x}(M'_{1-a}M''_a)PO_4$, $Li_xM''_avac_{1-a-y}M'PO_4$, $Li_x(M'_{1-a-y}M''_avac_y)PO_4$ or $Li_{x-a}M''_aM'_{1-y}vac_yPO_4$, wherein vac represents a vacancy in a structure of the compound. The compound includes any one of $Li_xvac_{1-x}(Fe_{1-a}M''_a)PO_4$, $Li_xM''_avac_{1-a-x}FePO_4$, $Li_x(Fe_{1-a-y}M''_avac_y)PO_4$, $Li_{x-a}M''_aFe_{1-y}vac_yPO_4$, $Li_xvac_{1-x}FePO_4$, or $Li_x(Fe_{1-a-y}Li_avac_y)PO_4$, wherein vac represents a vacancy in a structure of the compound.

In one or more embodiments, compound comprises doped $LiFePO_4$ in an olivine structure.

In one or more embodiments, the crystalline portion of the compound forms crystallites, at least 50% of which have a smallest dimension less than 500 nm, or less than 200 nm, or less than 100 nm, or less than 50 nm, or less than 20 nm, or less than 10 nm.

In one or more embodiments, the cathode contains one of the preceding compounds having a specific surface area of at least 15 $m^2/g$, or more than 20 $m^2/g$, or more than 30 $m^2/g$, or more than 40 $m^2/g$.

The above-described electrodes have a high material energy density (voltage vs. Li x charge capacity) while charging or discharging at certain current rates. In one or more embodiments, the electrode has a material energy density that, while charging or discharging at a rate $\geq 30$ mA per g of storage compound, is greater than 350 Wh/kg. In one or more embodiments, the electrode has a material energy density that, while charging or discharging at a rate $\geq 150$ mA per g of storage compound, is greater than 280 Wh/kg. In one or more embodiments, the electrode has a material energy density that while charging or discharging at a rate $\geq 300$ mA per g of storage compound, is greater than 270 Wh/kg. In one or more embodiments, the electrode has a material energy density that while charging or discharging at a rate $\geq 750$ mA per g of storage compound, is greater than 250 Wh/kg. In one or more embodiments, the electrode has a material energy density that, while charging or discharging at a rate $\geq 1.5$ A per g of storage compound, is greater than 180 Wh/kg. In one or more embodiments, the electrode has a material energy density that, while charging or discharging at a rate $\geq 3$ A per g of storage compound, is greater than 40 Wh/kg. In one or more embodiments, the electrode has a material energy density that, while charging or discharging at a rate $\geq 4.5$ A per g of storage compound, is greater than 10 Wh/kg.

A conventional bipolar device is schematically depicted in FIG. 1. The bipolar device 10 can be an energy storage system having a cathode 14 and anode 16 that are spaced apart from each other by separator region 22. The device may be infused or laminated with an electrolyte of liquid, gel, or solid polymer type. A carbonaceous conducting additive and an electrolyte material can be added to the positive electrode storage material, lithium cobalt oxide for example, to improve the electronic and ionic conductivity. Energy storage devices according to the present invention, such as but not limited to lithium ion batteries, can be based on liquid, gel or solid polymer electrolytes. For example, the typical lithium battery has a lithium foil or a composite carbon anode, and a liquid electrolyte containing a lithium salt and a composite cathode. The cathode and anode may occupy comparable volumes in the device, as illustrated in FIG. 1. The lithium battery can be charged by applying a voltage between the electrodes 14 and 16, which causes lithium ions and electrons to be withdrawn from lithium hosts at the battery's cathode. Lithium ions flow from cathode 14 to anode 16 through separator 22 to be reduced at the anode. During discharge, the reverse occurs; lithium ions and electrons enter lithium hosts at cathode 14 while lithium is oxidized to lithium ions at anode 16, which is typically an energetically favorable process that drives electrons through an external circuit 18, thereby supplying electrical power to a device to which the battery is connected.

Figure 2:
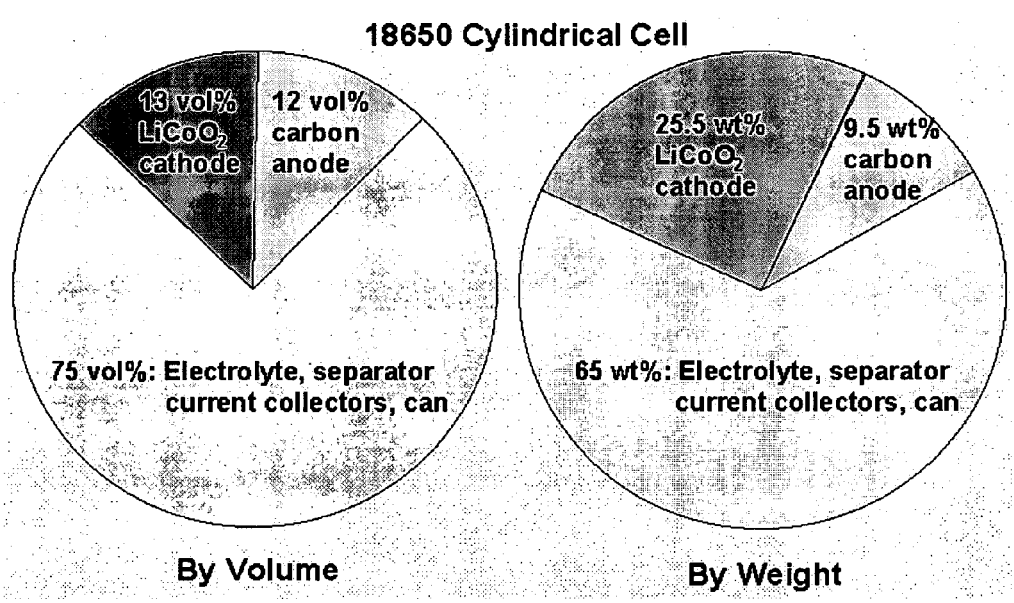
FIG. 2 shows typical volume and weight fractions of active materials in rechargeable lithium ion cells.

In a complete cell, a metal current collector 20 such as an aluminum foil may be attached to the outside of the cathode 14 in FIG. 1, and a metal current collector 21 such as Cu may be attached to the outside of the anode 16. The construction in FIG. 1 may be a sub-element of a multilayer device. In a typical laminated rechargeable lithium ion battery, for example, an aluminum foil current collector may be coated on both sides with a positive electrode formulation such as the lithium storage compound, carbon, and a binder. The thickness of the coating on each side may be about 25 micrometers to about 150 micrometers. A copper foil current collector may similarly be coated both sides with an anode formulation, to a thickness of about 20 micrometers to about 100 micrometers. The coated foils are separated from one another by a porous separator film. The energy density of such batteries depends on both the energy density of the storage compounds themselves, and the amount of inactive material. The electrochemically inactive materials include the electrode additives, electrolyte, current collectors, separators, tabs, can, and unused volume within the cell. Although the energy density of the battery can be improved by having less inactive material, this cannot arbitrarily be done since thin electrode coatings are required for adequate power density and utilization of the active material. FIG. 2 illustrates the typical weight fractions and volume fractions of active material in a conventional lithium ion rechargeable battery. Typical lithium-ion batteries based on laminated electrodes and designed for high energy density contain 25-35% by weight and 13-18% by volume of the positive electrode storage compound, typically $LiCoO_2$.

Figure 3:
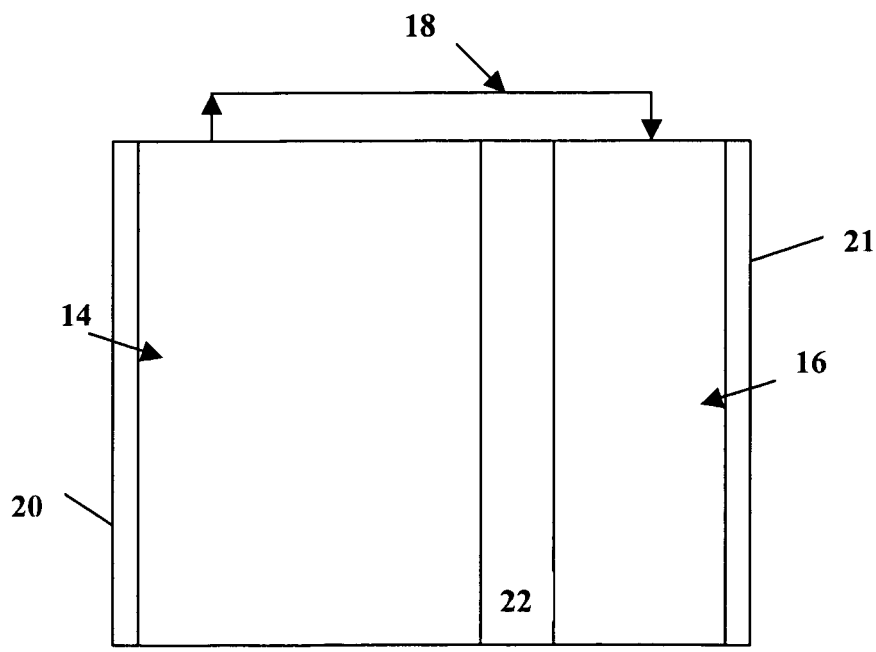
FIG. 3 is a schematic illustration of an electrochemical cell according to one or more embodiments of the invention.

A bipolar device according to one or more embodiments of the present invention is schematically depicted in FIG. 3. As in FIG. 1, a metal current collector 20 such as an aluminum foil may be attached to the cathode 14, and a metal current collector 21 such as Cu may be attached to the anode 16. The construction in FIG. 3 may be a sub-element of a multilayer device, and both current collectors may be coated on both sides. The coated foils are separated from one another by a porous separator film. However, due to the higher volumetric and gravimetric charge capacity of the anode 16, the weight and volume of the anode is much less than in a conventional system. The cathode may have the same thickness and area loading as the device in FIG. 1. Thus, the overall size of the device decreases and the charge capacity and thus the energy density and power density of the cell are improved. It will be immediately apparent that this system provides the same amount of energy capacity in a reduced volume and is advantageous for powering both small and large electrical devices. In one or more embodiments, the anode is a thin film having a thickness of less than about 6 micrometers, and in other embodiments is a thin film having a thickness of less than about 4 micrometers.

Figure 4:
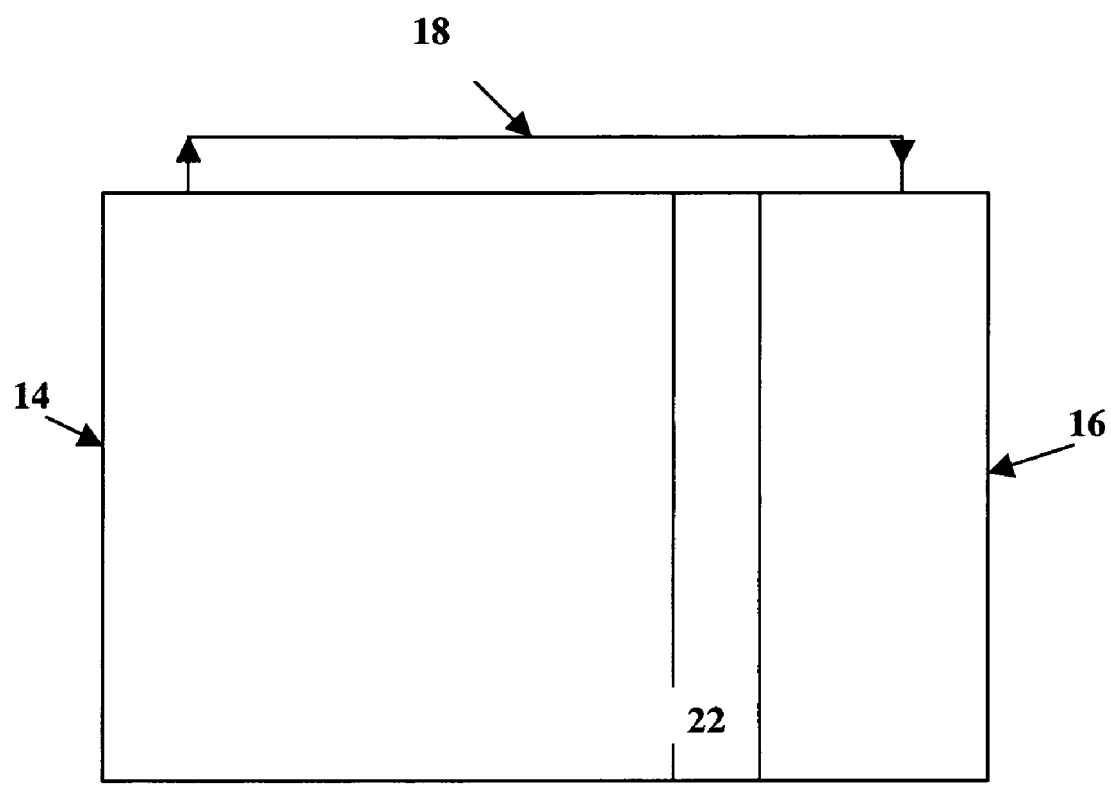
FIG. 4 is a schematic illustration of an electrochemical cell according to one or more embodiments of the invention.

A bipolar device according to one or more embodiments of the present invention is schematically depicted in FIG. 4. As in a conventional device, the bipolar device of the invention includes an anode 16 and a cathode 14 separated by a separator 22 containing an electrolyte (current collectors 20, 21 are not shown). However, the relative proportions of cathode and anode are redistributed to reflect the smaller volume and weight requirement of the anode. Thus the device contains a greater amount of cathode material (and hence a greater charge capacity) in the same volume as a conventional device, also resulting in an increase in the total cell energy density.

The bipolar devices of the present invention have anodes that occupy about 3% to 10% by weight or volume. In one or more embodiments, the anode is a thin film having a thickness of less than 10 micrometers, or less than 6 micrometers, or less than 4 micrometers, or even less than 2 micrometers.

The present invention is further illustrated through the following examples, which are illustrative in nature and are not intended to limit the scope of the invention.

Example 1

Metal-Doped Compositions

This example demonstrates the preparation of compositions having the formulation $Li(Fe_{1-a}M''_a)PO_4$, where M'' is Al, Ti, Zr, Nb, Ta, W, and Mg. Specific compositions, heat treatments, and results are listed in Tables 1 and 2, respectively. It was found that the electronic conductivity increased only for certain low concentrations of the metal additive or dopant. The specific range of concentration providing a high electronic conductivity (greater than about $10^{-5}$ S/cm) varied for each dopant but was generally less than about 5 mole % of the Fe concentration. In addition to having a low concentration of the dopant, it was necessary to heat treat the material under conditions such that high electronic conductivity was obtained. These conditions included heat treatment in a non-oxidizing gas atmosphere, including but not limited to argon, nitrogen, and nitrogen-hydrogen. Moreover, the temperature of heat treatment was less than about 800° C. At 600° C., the firing time in the above described gas atmosphere was less than about 100 hours.

Compositions as listed in Table 1 or otherwise described herein were prepared as follows or as adjusted to suit the particular composition by procedures illustrated for the following compositions. For example, Zr-doped $LiFePO_4$ samples of the following doping levels and batch sizes were prepared using the following starting materials, wherein zirconium ethoxide served as the source of the dopant:

|  | 5 mole % Zr, 5 g batch | 1 mole % Zr 2.5 g batch | 2 mole % Zr 2.5 g batch |
|---|---|---|---|
| $NH_4H_2PO_4$ | 3.6465 g | 1.7254 g | 1.7254 g |
| $Li_2CO_3$ | 1.1171 g | 0.554 g | 0.554 g |
| $FeC_2O_4 \cdot 2H_2O$ | 5.4177 g | 2.6715 g | 2.6715 g |
| $Zr(OC_2H_5)_4$ | 0.4303 g | 0.0407 g | 0.0814 g |

Similarly, 1 mole % and 2 mole % Ti-doped $LiFePO_4$ were prepared using the starting materials as above, except that titanium methoxide, $Ti(OCH_3)_4(CH_3OH)_2$ was used as the source of Ti (in place of the $Zr(OC_2H_5)_4$):

|  | 1 mole % Ti 2.5 g batch | 2 mole % Ti 2.5 g batch |
|---|---|---|
| $NH_4H_2PO_4$ | 1.7254 g | 1.7254 g |
| $Li_2CO_3$ | 0.554 g | 0.554 g |
| $FeC_2O_4 \cdot 2H_2O$ | 2.6715 g | 2.6715 g |
| $Ti(OCH_3)_4(CH_3OH)_2$ | 0.0354 g | 0.0708 g |

Undoped $LiFePO_4$ samples were prepared from the same materials except without the dopant salt. For the other samples, with the dopants as listed in Table 1, an appropriate metal salt was used. In particular, to prepare the Nb-doped samples, niobium phenoxide, $Nb(OC_6H_5)_5$, was used as the dopant salt; to prepare the Ta-doped samples, tantalum methoxide, $Ta(OCH_3)_5$, was used as the dopant salt; to prepare the W-doped samples, tungsten ethoxide, $W(OC_2H_5)_6$, was used as the dopant salt; to prepare the Al-doped sample, aluminum ethoxide, $Al(OC_2H_5)_3$, was used as the dopant salt; and to prepare the Mg-doped samples (Example 2), magnesium ethoxide, $Mg(OC_2H_5)_2$, was used as the dopant salt.

To prepare each sample, each of the components was weighed in an argon-filled glove box. They were then removed from the glove box and ball milled, using zirconia milling balls, in a polypropylene jar for about twenty hours in acetone. The milled mixture was dried at a temperature not exceeding 100° C., and then ground with a mortar and pestle in the argon-filled glove box. Each of the mixtures was then heat treated, given as "HT1" through "HT8" under the conditions listed in Table 2. In each case, a first heat treatment at 350° C. for ten hours was conducted in a flowing atmosphere of the specified gas. Each of the powder samples was then ground, using a mortar and pestle, and subjected to a second heat treatment at a higher temperature, in a flowing atmosphere of the specified gas. Pellets were pressed out of the heat treated powder sample prior to the second heat treatment, and placed in alumina crucibles during the second heat treatment so that the powders and sintered pellets were heat treated together.

2-point and 4-point (van der Pauw, vdP) conductivity measurements were performed according to known conventional procedures to evaluate the conductivity of the produced compounds. The room temperature conductivities of the doped samples are listed in Table 1. The samples, powders, were also evaluated, by x-ray diffraction after heat treatment, to determine if they had the expected olivine structure as well as to determine if there was a detectable secondary phase. In some cases, some of the powder samples were examined at higher resolution by transmission electron microscopy (TEM) and/or scanning transmission electron microscopy (STEM) to determine whether secondary phases were present, and to measure the concentration of the dopant metal within the crystalline grains of $LiFePO_4$ phase. This allowed a determination of whether the metal dopant, at the added concentration and heat treatment, was completely soluble or had exceeded its solubility limit in the $LiFePO_4$ phase.

In the samples listed in Table 1, the first numeral indicates the dopant, the second the concentration, and the third, the heat treatment. For example, sample 3c1 refers to a Ti-doped sample of 0.1 mole % concentration subjected to the heat treatment HT1. The concentration of dopant in mole percent refers to the relative molar fraction, Ti/(Ti+Fe) multiplied by 100.

TABLE 1

Results for Undoped and Doped Lithium Iron Phosphates

| Composition (Sample) | Heat Treatment | Room Temperature Conductivity (S/cm) 2-point | van der Pauw | XRD/TEM/STEM observations | Minor phases (XRD) |
|---|---|---|---|---|---|
| (1a1) $LiFePO_4$ | HT1 | $<10^{-6}$ | | Single phase olivine | |
| (1b2) $LiFePO_4$ | HT2 | $<10^{-6}$ | | Single phase olivine | |
| (1c3) $LiFePO_4$ | HT3 | $<10^{-6}$ | | Single phase olivine | |
| (1d6) $LiFePO_4$ | HT6 | $2.2 \times 10^{-9\dagger}$ | | Single phase olivine | |
| (1e6) $LiFePO_4$ | HT6 | $3.74 \times 10^{-10\ddagger}$ | | Single phase olivine | |
| (1f7) $LiFePO_4$ | HT7 | $2.22 \times 10^{-9\dagger}$ | | | |
| (1g8) $LiFePO_4$ | HT8 | $1.8 \times 10^{-10}$ | | Multi-phase | $Li_3PO_4$, $Fe_3P$ |
| (2a1) $Li(Al_{.002}Fe_{.998})PO_4$ | HT1 | $8.2 \times 10^{-5}$ | | Dopant soluble | |
| (2b6) $(Li_{.99}Al_{.01})FePO_4$ | HT6 | $\sim 10^{-3}$ | | Dopant soluble | |
| (3e1) $Li(Ti_{.01}Fe_{.99})PO_4$ | HT1 | $2.0 \times 10^{-4}$ | | Exceeds solubility | $Li_3PO_4$ |
| (3e2) $Li(Ti_{.01}Fe_{.99})PO_4$ | HT2 | $1.9 \times 10^{-4}$ | | Exceeds solubility | $Li_3PO_4$ |
| (3g6) $(Li_{.99}Ti_{.01})FePO_4$ | HT6 | $1.3 \times 10^{-3\ddagger}$ | | Dopant soluble | |
| (3g7) $(Li_{.99}Ti_{.01})FePO_4$ | HT7 | $2.3 \times 10^{-2\ddagger}$ | | Exceeds solubility | $Li_3PO_4$, $Fe_2P$ |
| (4b1) $Li(Zr_{.01}Fe_{.99})PO_4$ | HT1 | $3.7 \times 10^{-4}$ | | Exceeds solubility | $Li_3PO_4$ |
| (4e2) $(Li_{.99}Zr_{.01})FePO_4$ | HT8 | $1.6 \times 10^{-2}$ | | Exceeds solubility | $Li_3PO_4$, $Fe_2P$ |
| (5c1) $Li(Nb_{.002}Fe_{.998})PO_4$ | HT1 | $5.8 \times 10^{-4}$ | | Dopant soluble | |
| (5e7) $(Li_{.998}Nb_{.002})FePO_4$ | HT7 | $1.1 \times 10^{-2\ddagger}$ | | Dopant soluble | |
| (5g6) $(Li_{.99}Nb_{.01})FePO_4$ | HT6 | $2.2 \times 10^{-2}$ | $2.73 \times 10^{-2}$ | Dopant soluble | |
| (5h6) $(Li_{.98}Nb_{.02})FePO_4$ | HT6 | $2.8 \times 10^{-3}$ | | Exceeds solubility | $Fe_2P$ |
| (5i6) $(Li_{.96}Nb_{.04})FePO_4$ | HT6 | $\sim 10^{-6}$ | | Exceeds solubility | $Fe_2P$ |
| (6a1) $Li(Ta_{.002}Fe_{.998})PO_4$ | HT1 | $3.0 \times 10^{-5}$ | | Dopant soluble | |

TABLE 1-continued

Results for Undoped and Doped Lithium Iron Phosphates

| Composition (Sample) | Heat Treatment | Room Temperature Conductivity (S/cm) | | XRD/TEM/ STEM observations | Minor phases (XRD) |
|---|---|---|---|---|---|
| | | 2-point | van der Pauw | | |
| (7a1) Li(W$_{.002}$Fe$_{.998}$)PO$_4$ | HT1 | $1.5 \times 10^{-4}$ | | Dopant soluble | |

†measurement by AC Impedance Spectroscopy
‡measurement by two point method, using sputtered Au electrodes.

TABLE 2

Heat Treatment Conditions

| Heat Treatment | Conditions (all gases at 1 atm total pressure) | | |
|---|---|---|---|
| HT1 | 350° C., 10 hours, Ar | 600° C., 24 hours, Ar | — |
| HT2 | 350° C., 10 hours, N$_2$ | 600° C., 24 hours, N$_2$ | — |
| HT3 | 350° C., 10 hours, N$_2$ | 800° C., 24 hours, N$_2$ | — |
| HT6 | 350° C., 10 hours, Ar | 700° C., 20 hours, Ar | — |
| HT7 | 350° C., 10 hours, Ar | 850° C., 20 hours, Ar | — |
| HT8 | 350° C., 10 hours, Ar | 800° C., 15 hours, Ar | — |

The results in Table 1 show that heat treating undoped LiFePO$_4$ was not effective in producing an acceptable conductive material; each of the conductivities of sintered pellets was less than about $10^{-6}$ S/cm.

In contrast, for the dopants listed, at low concentrations, it was possible to produce a sample having a room temperature conductivity greater than about $10^{-5}$ S/cm. These conductivity values exceed known values for the positive electrode compound LiMn$_2$O$_4$.

Electron microscopy showed that the highly electronically conductive samples did not have a surface coating or other form of an additional conductive phase. Electrochemical results showed that the increase in conductivity resulted in an increase in the charge capacity, at a given charge/discharge current rate, without significantly changing the potential of the material, relative to lithium metal. Increasing the conductivity allowed the material to be charged and discharged at much higher rates without significant loss of capacity. That is, the energy density of these cathodes, and of a battery using these cathodes, can be greater relative to undoped LiFePO$_4$, by improving the electronic conductivity. Indeed, the increased rate capability of these cathodes can make them suitable for practical battery applications, whereas previous undoped and doped compounds in this family typically require a coating or co-synthesizing with a conductive additive, such as carbon.

It is believed that other polyanion compounds, aside from those having the olivine structure, such as those of the NASI-CON VOPO$_4$, LiFe(P$_2$O$_7$) or Fe$_4$(P$_2$O$_7$)$_3$ structures, can be similarly doped and synthesized to achieve high electronic conductivity. Further, based on the results obtained using Mg as a dopant (Example 2), it is believed that other Group IIA alkaline earth metals, such as Be, Ca, Sr, and Ba, should have similar effects. Based on the results obtained using Ti and Zr, which are Group IVA elements, it is believed that other Group IVA elements, such as Hf, should have similar effects. Based on the results obtained using Nb and Ta, which are Group VA elements, it is believed that other Group VA elements, such as V, should have similar effects. Based on the results obtained using W, which is a Group VIA element, it is understood that other Group VIA elements, such as Cr and Mo, should have similar effects. Based on the results obtained using Al, it is believed that other Group IIIB elements, such as B, Ga, and In, should have similar effects.

Example 2

Lithium Deficient and Substituted Compositions

In this example, doped LiFePO$_4$ was formulated to create Li deficiency and an excess of the other metals relative to the ideal cation stoichiometry of LiFePO$_4$. The composition has the formulation (Li$_{1-a}$M"$_a$)FePO$_4$. In this example M" was Mg at 0.01% (a 1% Mg-doped sample). The (Li$_{0.99}$Mg$_{0.01}$)FePO$_4$ sample was prepared as substantially described in Example 1, except that the doping was achieved using magnesium ethoxide, Mg(OC$_2$H$_5$)$_2$, and the sample was given a second heat treatment (after the initial heat treatment of 350° C. for 10 hours in argon) at 600° C. for twenty-four hours in argon, and at 700° C. for sixteen hours in argon. These samples were compared to a sample of composition Li(Fe$_{0.99}$Mg$_{0.01}$)PO$_4$, which was heat treated at 600° C. for twenty-four hours in argon.

The resistance of sintered pellets of each of the three samples was measured using a 2-probe method, wherein the contacts were spaced at an equal distance of about 5 mm in each instance. The (Li$_{0.99}$Mg$_{0.001}$)FePO$_4$ sample, heat treated at 700° C. for sixteen hours in argon, was black and conductive and had a low resistance of about 30 KΩ. The (Li$_{0.99}$Mg$_{0.01}$)FePO$_4$ sample, heat treated at 600° C. for twenty-four hours in argon, was still black and conductive but had higher resistance, about 250 KΩ. The Li(Fe$_{0.99}$Mg$_{0.01}$)PO$_4$ sample heat treated at 600° C. for twenty-four hours in argon also had a resistance of about 250 KΩ.

| Sample | Heat Treatment | Resistivity (KΩcm) |
|---|---|---|
| (Li$_{0.99}$Mg$_{0.01}$)FePO$_4$ | 350° C. for 10 hours in argon; 600° C. for 24 hours in argon | 30 |
| (Li$_{0.99}$Mg$_{0.01}$)FePO$_4$ | 350° C. for 10 hours in argon; 700° C. for 24 hours in argon | 250 |
| Li(Fe$_{0.99}$Mg$_{0.01}$)PO$_4$ | 600° C. for 24 hours in argon | 250 |

These results as well as others in Example 1 show that high conductivities can be obtained in a composition that is deficient in the alkali ion and excess in the other metals that would occupy octahedral sites in a LiFePO$_4$ structure. As mentioned, the results show that the solubility of the metal, M", was higher when the composition was formulated in this manner. Without being bound by any interpretation, it is reasonable to expect that having a deficiency of Li and excess of Mg allows one or the other octahedral site cations, Mg or Fe, to occupy octahedral sites in the structure that would normally be occupied by Li.

Based on the results obtained in this instance, where there is an excess of the non-alkaline metal and a deficiency of the alkali, it is believed that almost any metal added to the structure of the parent compound such that substitution occurs of the metal onto the M1 crystallographic sites of the ordered olivine structure normally occupied by the main alkaline metal, would have the desired effect of improving the electronic conductivity of the resulting compound.

Example 3

Storage Battery Using High Rate Capability Cathode and Thin Film Anode

A cathode storage compound of composition $(Li_{0.99}Zr_{0.01})FePO_4$, fired at 600° C. in Ar according to the methods of Example 1, and having a specific surface area of 41.8 m²/g, was formulated into an electrode by mixing 79 wt % of the active material, 10 wt % of SUPER P™ carbon, and 11 wt % Kynar 2801 binder in γ-butyrolactone as solvent. After casting onto an aluminum foil and drying, the coating was immersed in a plasticizing solvent of 15 wt % propylene carbonate in methanol, then pressed and dried. The resulting positive electrode (cathode) was tested against a lithium metal foil counterelectrode (anode; ca. 1 mm thick) in a Swagelok cell assembly using CELGARD® 2500 separator film and 1:1 EC:DEC with 1M $LiPF_6$ liquid electrolyte.

Figure 5:
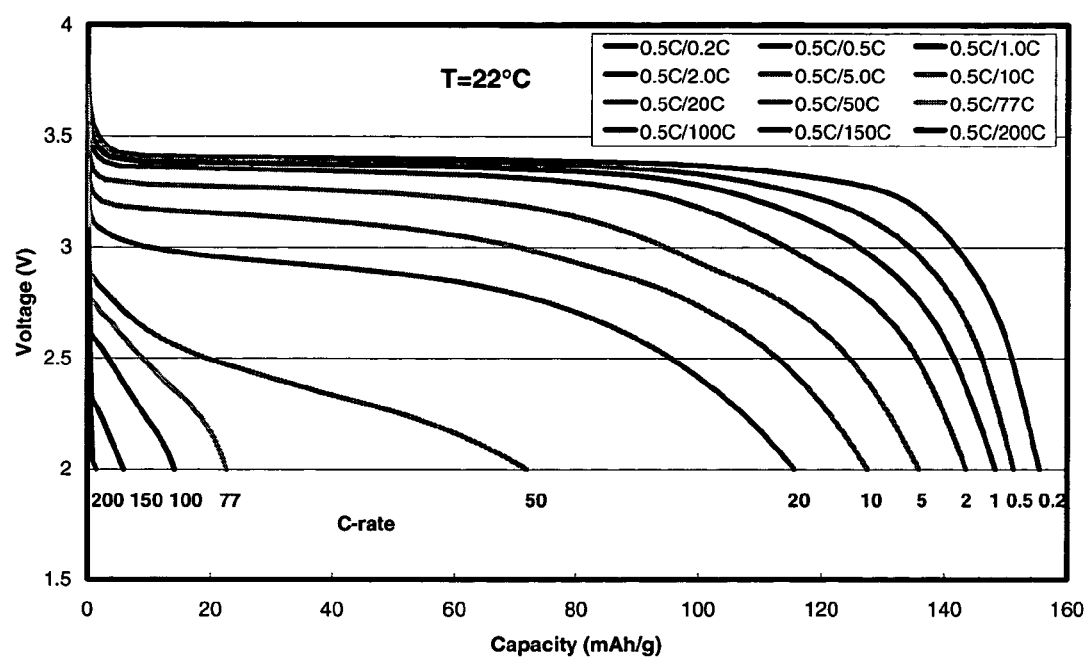
FIG. 5 shows discharge curves for constant-current constant-voltage cycling between 2-3.8V for an electrode made using $Li_{0.99}Zr_{0.01}FePO_4$ powder and tested to discharge rates of 200 C (30 A/g) at a temperature of 22° C. in a conventional cell design using a lithium metal negative electrode and nonaqueous liquid electrolyte.

FIG. 5 shows discharge curves for this cell measured by the constant-current constant-voltage (CCCV) method whereby the cell was first charged at 0.5 C rate (75 mA/g), then held at the upper limiting voltage of 3.8V until the charging current decayed to 0.001 mA, before discharging to 2V at the stated rate. The results in FIG. 5 show quite remarkably that even at a 50 C (7.5 A/g) discharge rate, about half of the capacity available at C/5 rate is provided by the cell.

Figure 6:
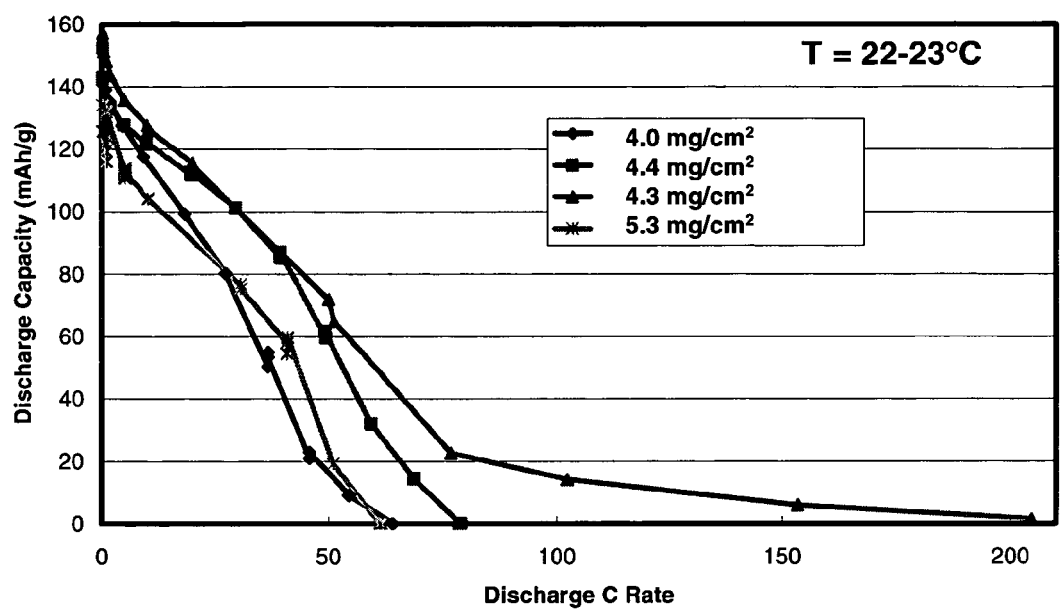
FIG. 6 shows discharge capacity vs. discharge rate curves for several electrodes of relatively light active material loading (4.0 to 5.3 mg/cm2) formulated using $Li_{0.99}Zr_{0.01}FePO_4$ powder heat treated at 600° C. or 700° C., and tested to high discharge rates greater than 60 C (9 A/g) at 22-23° C. in a conventional cell design using a lithium metal negative electrode and nonaqueous liquid electrolyte.

FIG. 6 compares the discharge energy density of several electrodes having the same storage compound composition as in FIG. 5 and fabricated in similar manner except for minor differences in heat treatment of the storage compound or in the electrode processing. All four electrodes have a similar loading of about 4-5 mg/cm², and all tests were conducted at 22-23° C. The cathode layer thicknesses range from 44 to 58 micrometers. The additional curves are for electrodes tested by continuous cycling rather than CCCV, in which the cell was charged at about a 1 C rate (150 mA/g) to an upper cutoff voltage of 4.2V before discharging at the rates given. The sample with 4.0 mg/cm² loading was not plasticized. The sample with 5.3 mg/cm² loading was prepared from a powder fired to a higher temperature than the others in FIG. 6, 700 C in Ar, and has a lower specific surface area of 26.4 m²/g. It is seen that all four of the samples in FIG. 6 exhibit a remarkably high capacity at high discharge C rates.

Figure 7:
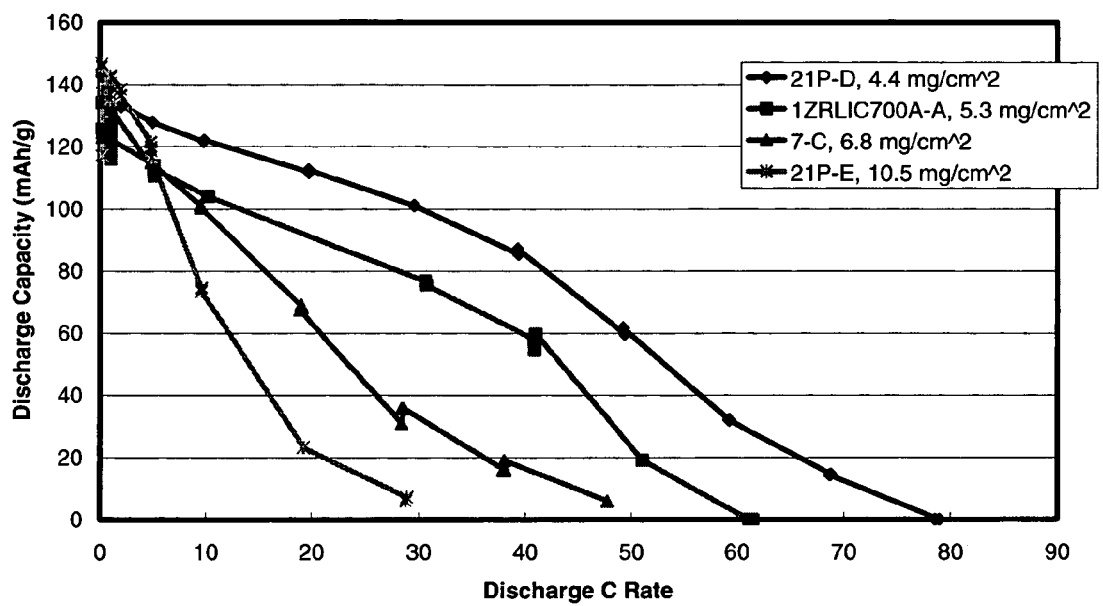
FIG. 7 shows discharge capacity vs. discharge rate curves for several electrodes of various active material loading formulated using $Li_{0.99}Zr_{0.01}FePO_4$ powder heat treated at 600° C. or 700° C., and tested to high discharge rates greater than 60 C (9 A/g) at 22-23° C. in a conventional cell design using a lithium metal negative electrode and nonaqueous liquid electrolyte.

FIG. 7 shows discharge capacity vs. discharge rate for four electrodes of varying loading from 4.4 mg/cm² up to 10.5 mg/cm². While all have similar capacity at low discharge rates, it is seen that at high discharge rates beyond 5 C rate (750 mA/g), the thinner electrodes exhibit markedly higher capacity. The results in FIG. 5-7 show that in this instance the storage compound itself is capable of very high power density, but that as the electrode loading increases, other factors become rate-limiting and lower the energy density and power density available from the electrode. It is well-known that several factors can limit the charge-discharge behavior of a composite electrode, including its overall electronic conductivity, ionic transport through the liquid electrolyte-filled pore network, the surface exchange rate across the surface of the storage material particle, and solid-state transport within the particle, such as solid state diffusion or the rate of phase transformation in the case of a two-phase storage material. In the present Example, the possibility of a rate-limiting step at the negative electrode was ruled out by other tests. At the high discharge rates used here, the decreasing capacity with increasing loading indicates that transport at the surface of, or within the storage material compound particles, are not necessarily rate-limiting, but transport within the composite electrode is.

Figure 8:
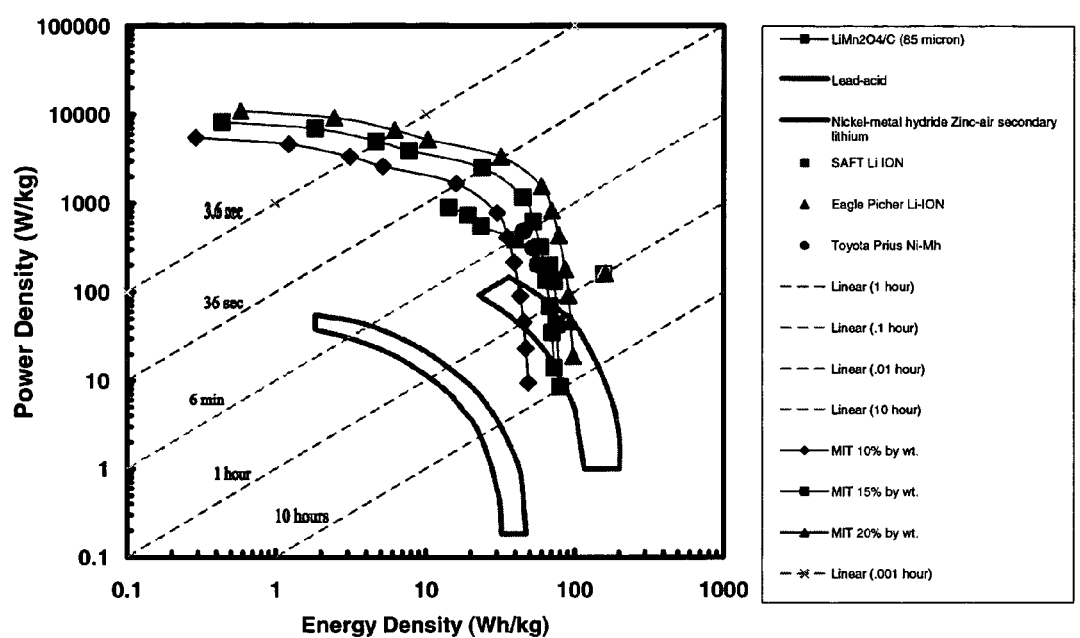
FIG. 8 shows a Ragone plot of log power density vs. log energy density for storage battery cells based on the high power density lithium storage material of FIG. 5 and a carbon-based anode; curves assuming 10 wt %, 15 wt %, and 20 wt % of cathode in the cell are shown; the cells of the present invention are able to provide approximately 25-40% higher power density and energy density than conventional cells under identical test conditions.

Using the discharge capacity data of FIG. 5, the energy density of the lithium storage cathode as a function of discharge current rate has been calculated. It is well-known that typical lithium-ion batteries, based on laminations of electrodes of $LiCoO_2$ as a cathode active material and carbon as an anode active material, and designed for high energy density, contain 25-35% by weight and 13-18% by volume of the positive electrode storage compound. While more detailed calculations of the weight and volume fractions of materials are used for specific designs, these approximate values provide an adequate basis for determining the energy density and power density of conventional Li ion cell designs utilizing the lithium storage cathode of the present example with a conventional carbon anode. Accounting for the 29% lower crystal density of $LiFePO_4$ compared to $LiCoO_2$, and assuming a somewhat lower packing density due to the high specific surface area, it is conservatively estimated that an optimized cell could contain 10-20 wt % of the positive electrode active material. Using the results of FIG. 5 and taking into account a slightly lower cell voltage when it is used in conjunction with a carbon electrode (3.25 vs. 3.7 V for LiCoO2/C), the power density—energy density results shown in FIG. 8 are obtained. Results are shown for 10 wt %, 15 wt %, and 20 wt % of the positive electrode active material. Power and energy densities for complete discharge of a cell of 800-1500 W/kg and 30-60 Wh/kg at a 20 C (3 A/g) rate, 1500-4200 W/kg and 15-30 Wh/kg at a 50 C (7.5 A/g) rate, and 2500-5000 W/kg and 5-10 Wh/kg at a 80 C (12 A/g) rate, are obtained.

Compared to these results, the power density/energy density of the devices of the invention can be substantially greater. At a loading for a single coating of 5 mg/cm² of conductive $LiFePO_4$ having a specific capacity of about 150 mAh/g, the capacity per unit area of electrode is about 0.75 mAh/cm². From Table 1, it is noted that many metal-based anodes have a gravimetric capacity in excess of that for carbon and also a density much greater than that of carbon. Taking silicon as an example, if silicon were lithiated to a capacity of 750 mAh/g, the anode loading necessary to provide a balanced cell would be 1 mg/cm2, and the thickness of a dense Si film would be 4 micrometers. At 1500 mAh/g, which is achievable by forming the compound $Li_{12}Si_7$, the required thickness of Si is 2 micrometers. At 3000 mAh/g, achievable by forming the lithiated compound $Li_{13}Si_4$, the required thickness of Si is 1 micrometer.

For a thin film anode comprising tin metal, which has a density of 7.31 g/cm³, a partially lithiated Sn—Li alloy having 500 mAh/g capacity would necessarily be 2.1 micrometers thick, and a fully lithiated alloy of composition $Li_{22}Sn_5$ having 994 mAh/g capacity would necessarily be 1 micrometer thick. Thus it is seen that a thin film metal-based anode can form a balanced cell when used together with a powder-based high power cathode.

By contrast, a typical carbon powder based anode coating of 65% volume density and having the same capacity per unit area would necessarily be about 16 micrometers thick. A fully dense carbon film would need to be 10 micrometers thick. These are thicknesses that are difficult to deposit as a dense or porous film directly in the one instance, and difficult to fabricate as a powder-based suspension coating in the second instance.

In a typical high energy density lithium ion cell, the anode compound, its associated electrolyte and additives constitute about 40% of the volume of the cell stack and 30% of the cell volume, and about 28% of the weight of the cell stack and 22% of the cell volume. By using a thin film anode of minimal volume and mass, and leaving the cathode unchanged, the volumetric energy density of the cell increases by about 42% and the gravimetric energy density by about 28%. The magnitude of these increases is somewhat lower for high energy density cells with thin electrodes of lower loading. Considering that $LiFePO_4$ has about a 30% lower volumetric energy density than $LiCoO_2$, and approximately equal gravimetric energy density, it is seen that the use of a thin film metal anode can substantially compensate for the volumetric energy deficiency of $LiFePO_4$, resulting in cells of high energy density and high power density.

It is readily appreciated that irrespective of the power capability of the polyanion compound and electrode incorporating the compound, the energy density of the cell can be substantially improved by using a thin film metal anode.

It is also known that bulk metal-based lithium anodes do not cycle reversibly due to the large volume changes upon lithiation. However, by using a thin film anode with a thickness in the range of a few micrometers or less, the present invention allows good cycling of the cell.

It is also known that passivation of the surface of metal anodes with a suitable solid-electrolyte-interface (SEI) layer is necessary for good cycling. This SEI layer is sufficiently electronically insulation to prevent continued growth of the layer by reaction with the components of the electrolyte, while being highly ionically conductive and sufficiently thin so as to allow rapid transport of lithium. According to the present invention, a film of a compound that forms a good SEI in contact with liquid electrolytes, such as carbon or lithium carbonate or lithium phosphate, can be deposited on the surface of the thin film metal anode prior to assembly of the cell.

In order to confine the lithiation of the anode to the thin metal film, or to accommodate volume expansion and contraction during lithiation, a separate barrier layer can be deposited on the current collector prior to deposition of the thin film anodes. Multiple deposited layers allowing a grading of electrochemical, thermomechanical and elastic properties can also be used in order to allow reversible cycling of the thin film anode.

Such cells could provide power densities not possible in current nickel metal-hydride (400-1200 W/kg, 40-80 Wh/kg) and lithium-ion battery technology (800-2000 W/kg, 80-170 Wh/kg). These capabilities, in a low-cost and ultra-safe storage material, may be especially attractive for high power and large battery applications including but not limited to power tools and hybrid and electric vehicles.

Although various embodiments that incorporate the teachings of the present invention have been shown and described in detail herein, those skilled in the art can readily devise many other varied embodiments that incorporate these teachings.

What is claimed is:

1. A high energy density electrochemical device comprising:
    a cathode comprising an alkali metal transition metal polyanion compound;
    a thin film metal anode comprising an electroactive metal or metalloid alloyed with the alkali metal, wherein the alkali metal is stored in the anode by forming the metal-alkali or the metalloid-alkali alloy; the total alkali metal content of the anode and cathode is less than the theoretical maximum concentration of the alkali metal at saturation in the metal or metalloid of the anode; and the thickness of the thin film metal anode is greater than about 1 µm and less than or equal to about 10 µm; and
    an electrolyte in ionic contact with both the anode and the cathode.

2. The device of claim 1, wherein the cathode is in electronic communication with a first current collector and the anode is in electronic communication with a second current collector.

3. The device of claim 1, wherein the alkali metal comprises lithium.

4. The device of claim 3, wherein the alkali metal transition metal polyanion compound comprises a lithium transition metal phosphate, where the transition metal is one or more of V, Mn, Fe, Co, or Ni.

5. The device of claim 1, wherein the alkali metal transition metal polyanion compound has a specific surface area of at least 15 $m^2/g$.

6. The device of claim 5 wherein the alkali metal transition metal polyanion compound has a specific surface area in the range of about 20 $m^2/g$ to about 40 $m^2/g$.

7. The device of claim 1, wherein the alkali metal transition metal polyanion compound has a crystalline fraction comprising crystallites having a mean smallest dimension of less than 500 nm.

8. The device of claim 1, wherein the alkali metal transition metal polyanion compound has a crystalline fraction comprising crystallites having a mean smallest dimension of less than 100 nm.

9. The device of claim 1, wherein the alkali metal transition metal polyanion compound has a crystalline fraction comprising crystallites having a mean smallest dimension of less than 20 nm.

10. The device of claim 1, wherein the cathode contains a compound comprising a composition $(A_{b-a}M''_a)_x M'_y (XD_4)_z$, $(A_{b-a}M''_a)_x M'_y (DXD_4)_z$, or $(A_{b-a}M''_a)_x M'_y (X_2D_7)_z$, having a conductivity at 27° C. of at least about $10^{-8}$ S/cm, wherein A is at least one of an alkali metal or hydrogen, M' is a first-row transition metal, X is at least one of phosphorus, sulfur, arsenic, boron, aluminum, silicon, vanadium, molybdenum and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001 < a \leq 0.1$, $a \leq b \leq 1$, and x, y, and z are greater than zero and have values such that $(b-a)_x$ plus the quantity ax times the formal valence or valences of M'' plus y times the formal valence or valences of M' is equal to z times the formal valence of the $XD_4$, $X_2D_7$ or $DXD_4$ group.

11. The device of claim 1, wherein the cathode contains a compound comprising a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, having a conductivity at 27° C. of at least about $10^{-8}$ S/cm, wherein A is at least one of an alkali metal or hydrogen, M' is a first-row transition metal, X is at least one of phosphorus, sulfur, arsenic, boron, aluminum, silicon, vanadium, molybdenum and tungsten, M'' is any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001 < a \leq 0.1$, and x is equal to or greater than 0, y and z are greater than 0 and have values such that x, plus y(1−a) times a formal valence or valences of M', plus ya times a formal valence or valence of M", is equal to z times a formal valence of the $XD_4$, $X_2D_7$, or $DXD_4$ group.

12. The device of claim 1, wherein the cathode composition is any of $Li_x(M'_{1-a}M''_a)PO_4$, $Li_xM''_aM'PO_4Li_x(M'_{1-a-y}M''_aLi_y)PO_4$, $Li_x(M'_{1-y}Li_y)PO_4$ or $Li_{x-a}M''_aM'_{1-y}Li_yPO_4$, wherein M' is one or more of V, Mn, Fe, Co, or Ni, M" is any of a Group IIA, IIIA, IVA, VA, VIA, VIIA, VIIIA, IB, IIB, IIIB, IVB, VB, and VIB metal, $0.0001 < a \leq 0.1$, $0.0001 < y \leq 0.1$, and x is equal to or greater than 0.

13. The device of claim 1, wherein the composition is $Li_xvac_{1-x}(M'_{1-a}M''_a)PO_4$, $Li_xM''_avac_{1-a-x}M'PO_4$, $Li_x(M'_{1-a-y}M''_avac_y)PO_4$ or $Li_{x-a}M''_aM'_{1-y}vac_yPO_4$, wherein vac represents a vacancy in a structure of the compound, M' is one or more of V, Mn, Fe, Co, or Ni, M" is any of a Group IIA, IIIA, IVA, VA, VIA, VIIA, VIIIA, IB, IIB, IIIB, IVB, VB, and VIB metal, $0.0001 < a \leq 0.1$, $0.0001 < y \leq 0.1$, and x is equal to or greater than 0.

14. The device of claim 1, wherein the composition is $Li_xvac_{1-x}(Fe_{1-a}M''_a)PO_4$, $Li_xM''_avac_{1-a-x}FePO_4$, $Li_x(Fe_{1-a-y}M''_avac_y)PO_4$, $Li_{x-a}M''_aFe_{1-y}vac_yPO_4$, $Li_x(Fe_{1-a-y}Li_avac_y)PO_4$, or $Li_xvac_{1-x}FePO_4$, wherein vac represents a vacancy in a structure of the compound, M" is any of a Group IIA, IIIA, IVA, VA, VIA, VIIA, VIIIA, IB, IIB, IIIB, IVB, VB, and VIB metal, $0.0001 < a \leq 0.1$, $0.0001 < y \leq 0.1$, and x is equal to or greater than 0.

15. The device of claim 1, wherein the alkali metal transition metal polyanion compound comprises a doped $LiFePO_4$ having an olivine structure.

16. The device of claim 1, wherein the cathode compound has a gravimetric capacity of at least about 80 mAh/g while being used in an electrochemical device that is charging/discharging at greater than about 1 C rate.

17. The device of claim 16, wherein the gravimetric capacity is in the range of about 100 mAh/g to about 160 mAh/g.

18. The device of claim 16, wherein the device is charging/discharging at greater than about 2 C rate.

19. The device of claim 1, wherein the anode occupies a volume or a weight in the device in the range of about 3 to about 10%.

20. The device of claim 1, wherein the thin film metal anode is greater than about 1 μm and less than or equal to about 6 μm.

21. The electrochemical device of claim 20, wherein the thin layer cathode comprises about 10 to 25 wt % of the device.

22. The electrochemical device of claim 21, wherein the thin film anode comprises about 3 to 10 wt % of the device.

23. The electrochemical device of claim 20, wherein the device is a disposable battery cell.

24. The electrochemical device of claim 20, wherein the device is a rechargeable battery cell.

25. The electrochemical device of claim 20, wherein the device exhibits upon discharge an energy of at least 0.25 Wh.

26. The electrochemical device of claim 20, wherein the device exhibits upon discharge an energy of at least 1 Wh.

27. The electrochemical device of claim 20, wherein the device exhibits upon discharge an energy of at least 5 Wh.

28. The storage battery device of claim 20 wherein the device exhibits upon discharge an energy of at least 10 Wh.

29. The electrochemical device of claim 20 wherein the device exhibits upon discharge an energy of at least 20 Wh.

30. The electrochemical device of claim 20 wherein the device exhibits upon discharge an energy of at least 30 Wh.

31. The electrochemical device of claim 20 wherein the device exhibits upon discharge an energy of at least 40 Wh.

32. The electrochemical device of claim 20 wherein the device exhibits upon discharge an energy of at least 50 Wh.

33. The electrochemical device of claim 20, wherein the device exhibits upon discharge an energy of at least 100 Wh.

34. The electrochemical device of claim 20, wherein the device exhibits upon discharge a gravimetric energy density of at least 30 Wh/kg or a volumetric energy density of at least 100 Wh/liter.

35. The electrochemical device of claim 20, wherein the device exhibits upon discharge a gravimetric energy density of at least 50 Wh/kg or a volumetric energy density of at least 200 Wh/liter.

36. The electrochemical device of claim 20, wherein the device exhibits upon discharge a gravimetric energy density of at least 90 Wh/kg or a volumetric energy density of at least 300 Wh/liter.

37. The electrochemical device of claim 20, wherein the device exhibits upon discharge a gravimetric power density of at least 100 W/kg or a volumetric power density of at least 350 W/liter.

38. The electrochemical device of claim 20, wherein the device exhibits upon discharge a gravimetric power density of at least 500 W/kg or a volumetric power density of at least 500 W/liter.

39. The electrochemical device of claim 20, wherein the device exhibits upon discharge a gravimetric power density of at least 1000 W/kg or a volumetric power density of at least 1000 W/liter.

40. The electrochemical device of claim 20, wherein the device exhibits upon discharge a gravimetric power density of at least 2000 W/kg or a volumetric power density of at least 2000 Wh/liter.

41. The electrochemical device of claim 20, wherein the device exhibits upon discharge a gravimetric energy density of at least:
   30 Wh/kg at a power density of at least 500 W/kg, or
   20 Wh/kg at a power density of at least 1000 W/kg, or
   10 Wh/kg at a power density of at least 1500 W/kg, or
   5 Wh/kg at a power density of at least 2000 W/kg, or
   2 Wh/kg at a power density of at least 2500 W/kg, or
   1 Wh/kg at a power density of at least 3000 W/kg.

42. The electrochemical device of claim 20, wherein the device exhibits upon discharge a gravimetric energy density of at least:
   50 Wh/kg at a power density of at least 500 W/kg, or
   40 Wh/kg at a power density of at least 1000 W/kg, or
   20 Wh/kg at a power density of at least 2000 W/kg, or
   10 Wh/kg at a power density of at least 3000 W/kg, or
   4 Wh/kg at a power density of at least 4000 W/kg, or
   1 Wh/kg at a power density of at least 5000 W/kg.

43. The electrochemical device of claim 20, wherein the device exhibits upon discharge a gravimetric energy density of at least:
   80 Wh/kg at a power density of at least 1000 W/kg, or
   70 Wh/kg at a power density of at least 2000 W/kg, or
   60 Wh/kg at a power density of at least 3000 W/kg, or
   55 Wh/kg at a power density of at least 4000 W/kg, or
   50 Wh/kg at a power density of at least 5000 W/kg, or
   30 Wh/kg at a power density of at least 6000 W/kg, or
   10 Wh/kg at a power density of at least 8000 W/kg.

44. The electrochemical device of claim 1 wherein the metal or metalloid is selected from the group consisting of aluminum, silver, boron, bismuth, cadmium, gallium, germanium, indium, lead, tin, silicon, antimony, and zinc.

45. The device of claim 1, wherein the alkali metal comprises lithium.

46. The device of claim 1, wherein the total alkali metal content of the anode and cathode is about 90% of the theoretical maximum concentration of the alkali metal at saturation in the metal or metalloid of the anode.

47. The device of claim 1, wherein the total alkali metal content of the anode and cathode is about 70% of the theoretical maximum concentration of the alkali metal at saturation in the metal or metalloid of the anode.

48. The device of claim 1, wherein the total alkali metal content of the anode and cathode is about 50% of the theoretical maximum concentration of the alkali metal at saturation in the metal or metalloid of the anode.

49. The device of claim 1, wherein the total alkali metal content of the anode and cathode is about 40% of the theoretical maximum concentration of the alkali metal at saturation in the metal or metalloid of the anode.

50. The device of claim 1, wherein the total alkali metal content of the anode and cathode is about 30% of the theoretical maximum concentration of the alkali metal at saturation in the metal or metalloid of the anode.

51. A method of operating an electrochemical cell with improved cycling stability, comprising the steps of:
   a. providing an electrochemical cell comprising:
      a cathode comprising an alkali metal transition metal polyanion compound;
      a thin film metal anode comprising a metal or metalloid that can be alloyed with alkali metal; and
      an electrolyte in ionic contact with both the anode and the cathode;
   b. discharging the cell to generate an external current and charging the cell, wherein during charging the cathode supplies an amount of alkali metal to the anode that is less than the maximum storage capacity of the anode.

52. The method of claim 51, wherein the alkali metal comprises lithium.

53. The method of claim 52, wherein the cathode supplies an amount of alkali metal to the anode that is 90% of the maximum capacity of the anode.

54. The method of claim 52, wherein the cathode supplies an amount of alkali metal to the anode that is 70% of the maximum capacity of the anode.

55. The method of claim 52, wherein the cathode supplies an amount of alkali metal to the anode that is 50% of the maximum capacity of the anode.

56. The method of claim 52, wherein the cathode supplies an amount of alkali metal to the anode that is 40% of the maximum capacity of the anode.

57. The method of claim 52, wherein the cathode supplies an amount of alkali metal to the anode that is 30% of the maximum capacity of the anode.

58. The method of claim 51, wherein the cell exhibits upon discharge, an energy of at least about 0.25 Wh.

59. The method of claim 51, wherein the cell exhibits upon discharge an energy in the range of about 1-100 Wh.

* * * * *